INVENTOR.
EDWARD V. LEWIS
BY John A. Duffy
ATTORNEY.

June 2, 1970 E. V. LEWIS 3,515,888

MANUAL OPTICAL DIGITIZER

Filed Oct. 27, 1967 5 Sheets-Sheet 2

INVENTOR.
EDWARD V. LEWIS
BY John A. Duffy
ATTORNEY.

June 2, 1970 E. V. LEWIS 3,515,888

MANUAL OPTICAL DIGITIZER

Filed Oct. 27, 1967 5 Sheets-Sheet 3

INVENTOR.
EDWARD V. LEWIS

BY John A. Duffy

ATTORNEY.

INVENTOR.
EDWARD V. LEWIS
BY John A. Duffy
ATTORNEY.

June 2, 1970 E. V. LEWIS 3,515,888

MANUAL OPTICAL DIGITIZER

Filed Oct. 27, 1967 5 Sheets-Sheet 5

INVENTOR.
EDWARD V. LEWIS
BY John A. Duffy
ATTORNEY.

United States Patent Office 3,515,888
Patented June 2, 1970

3,515,888
MANUAL OPTICAL DIGITIZER
Edward V. Lewis, Newport Beach, Calif., assignor to California Computer Products, Inc., Anaheim, Calif., a corporation of California
Filed Oct. 27, 1967, Ser. No. 678,661
Int. Cl. G01p *13/00;* G02f *7/00*
U.S. Cl. 250—237 5 Claims

ABSTRACT OF THE DISCLOSURE

The digitizing of graphically displayed information may be accomplished using a reticle assembly having as a modus operandi for locating its position a self-contained means for generating a narrow beam of infrared energy. The instantaneous position of the reticle relative to a known origin may be determined by monitoring the positional changes of the beam using transmitting optical gratings which act to chop the beam as it is moved relative thereto. The gratings may be coded so as to provide directional information as to the movement of the beam. The number of times the light beam is chopped by the gradient as it is moved from one position to another can be totalled in an electronic counter to provide a digital representation of the distance traveled.

CROSS REFERENCE TO RELATED APPLICATION

"Optical Scanning Head," Edward V. Lewis, Ser. No. 673,457 filed Oct. 6, 1967.

BACKGROUND OF THE INVENTION

Graphical information must be digitized before it can be stored and operated on by a digital computer. Prior art devices for accomplishing this function fall into one of several categories. The fully automatic approach utilizes a scanning raster and a light sensitive head for recording the light/dark data transitions. This scheme suffers from the disadvantage that a large amount of data is required to be stored and processed in order to sort out the information content. A further disadvantage of the automatic system is that it is unable to distinguish color differences or shades of grey.

The semi-automatic method for digitizing graphically displayed information involves the use of a light-sensitive head in conjunction with an X–Y recording apparatus. Once the operator locates a given line, a prescribed search and track routine is initiated and X–Y coordinate information is generated as the scanner follows the course of the line. The disadvantage of this system is that it will only follow a given line, is easily confused by intersecting lines or enclosed areas and in addition, has difficulty in recognizing color or shades of grey.

A third approach is the manually positioned mechanical apparatus for recording in either analog or digital representation the position of a given point on some graphical display. Analog devices typically employ an X axis and Y axis sliding potentiometer for Cartesian measurement or alternatively an angular measuring device in conjunction with a radius measuring sliding potentiometer for obtaining polar coordinate representation. In either case the analog information must be converted to digital form for computer processing. A few devices have been developed which generate a digital representation of a given coordinate, as for example by utilizing the capacitive effect of a metal tipped pencil to excite an intersecting pair of an underlying grid of X–Y conductors. Such systems are limited to relatively small areas (E. G. 100 lines per inch). In addition, such systems are not adaptable to use with information displayed in other than on a single sheet of recording medium as for example books, cloth materials, patterns, etc.

SUMMARY OF THE INVENTION

The manual digitizer described herein comprises a reticle assembly which is manually moveable in a plane parallel to the graphical display. The reticle assembly contains a source of optical energy and a lens system for collimating the energy in a narrow beam. An overhead optical system which views the entire area of the graphical display is utilized to determine the instantaneous position of the recticle assembly. This is accomplished by splitting the optical beam generated by the reticle assembly into two orthogonal beams whose deflection relative to an optical center line represents the X–Y coordinate of the reticle relative to a fixed $X_0,Y_0$ origin. A digital representation of the actual location of a given point is obtained by passing the separate X and Y beams through an optical grating and counting the pulses with a light sensor and electronic counter as the reticle is moved between two points on the display. A second coded grating is utilized to determine the direction of movement of each beam in order to provide directional (sense) information to the electronic counter. After the reticle has been moved from a fixed origin and properly positioned over a point of interest the operator depresses a button and the value recorded in the X and Y counters is stored by some recording means such as a computer or magnetic tape. The operator then moves to the next point to be recorded and repeats the process.

The present invention does not depend upon an underlying system of grids to obtain digital representation. Nor is it limited in its application to single thickness material or the digitizing of information presented on a non-metallic medium. Resolution and display area are only limited by the optical grating and mechanical alignment. Accordingly, a paramount object of the present invention is to provide a high resolution manual digitizer.

A second object of the invention is to provide a manual digitizer which is capable of digitizing information presented over an extended area. A further object of the invention is to provide a manual digitizer which is not limited in its application to graphical information recorded on thin sheets of recording medium. Another object of the invention is to provide a digitizer which requires no mechanical coupling in order to perform the digitizing operations.

Further objects and advantages of the present invention will be obvious from the description of the preferred embodiment given below.

DETAILED DESCRIPTION OF A PREFERRED EMBODIMENT

Figure 1:
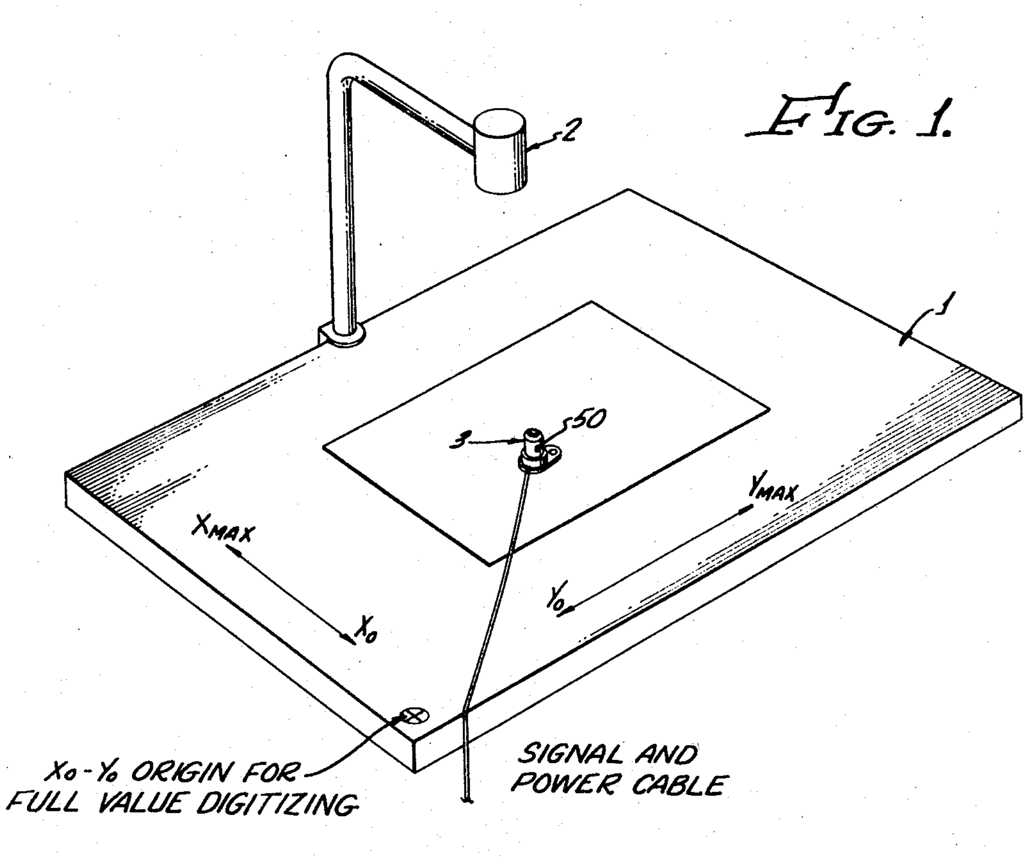
FIG. 1 illustrates the general arrangement of the operative features of the invention.

Adverting to the drawings in detail and particularly FIG. 1, the large flat display area 1 is viewed by the optical system 2 so that the position of the reticle assembly 3 may be determined. The reticle assembly 3 houses a source of infrared energy and a lense system for collimating the energy in a narrow beam which is always perpendicular to the plane of the display 1.

Figure 2:
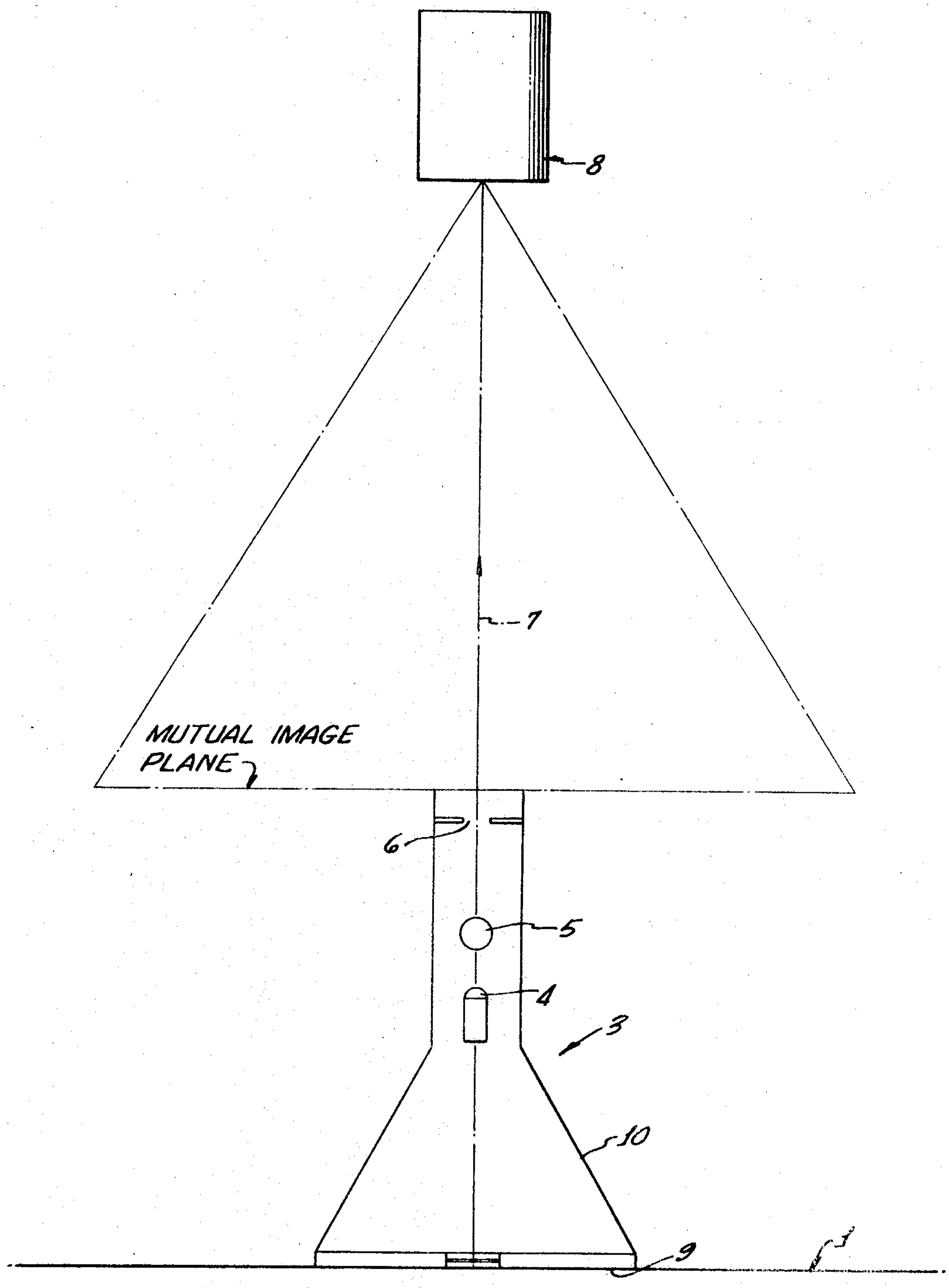
FIG. 2 shows in detail the construction of the movable reticle assembly.

The details of the reticle assembly are shown in FIG. 2. An infrared emitting diode 4 such as the General Electric LED10 is utilized as a source of infrared energy and an infrared transparent lense 5 such as ruby or sapphire is employed in conjunction with the limiting aperture 6 to collimate the energy emitted by the diode 4 in a narrow beam 7 which is within the field of view of the overhead optical system 8. The beam is maintained perpendicular to the plane of the graphical display 1 by the machined surface 9 of the transparent housing 10. Where third dimensional material is being digitized it is of course necessary to provide a transparent artificial working surface such as a sheet of glass above the three dimensional material so as to maintain the required perpendicularity of the infrared beam with respect to such surface.

Figure 3:
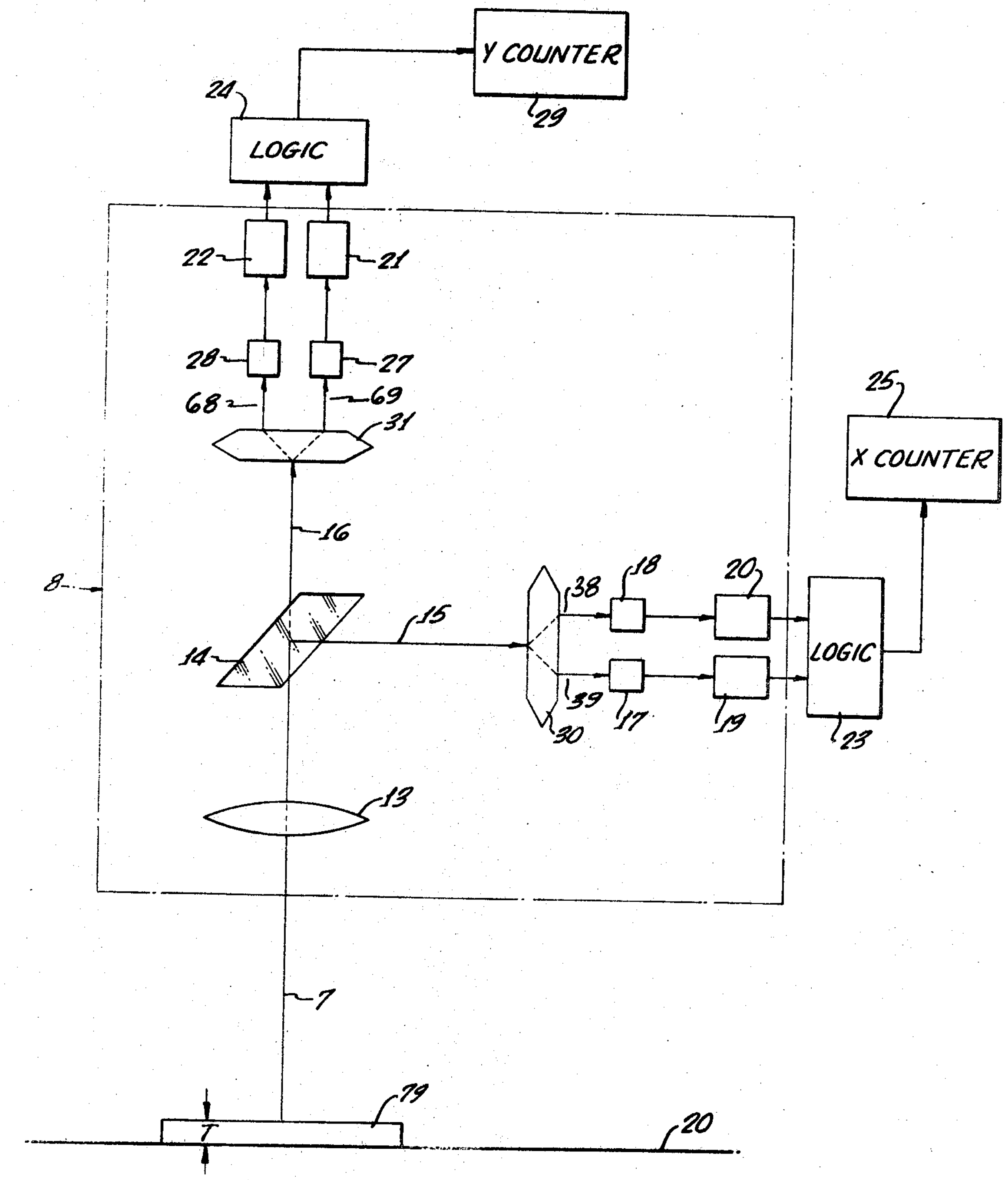
FIG. 3 shows the details of the overhead optical system.

The actual conversion of the reticle position to a digital number is accomplished by the overhead optical assembly 8. Referring to FIG. 3, the infrared beam 7 is viewed by the lens system 13 which focuses it upon the beam splitting mirror 14. The reflected part of beam 15 falls upon the beam splitting lense 30 and the transmitted part 16 falls upon the beam splitting lens 31. The beam splitting lenses 30 and 31 act to generate two separate parallel beams 38, 39 in the X axis and 68, 69 in the Y axis each of which are converted to digital positional information by the coded X gratings 17 and 18 and the coded Y gratings 27 and 28 respectively. The energy passing through the X axis gratings 17 and 18 and the Y axis gratings 27 and 28 is detected by the corresponding X and Y axis sensors 19, 20 and 21, 22. The output of the X sensors 19 and 20 and the Y sensors 21 and 22 is an electrical signal which is decoded by the logic circuits 23 and 24 to cause the X counter 25 and Y counter 29 to increment or decrement according to the direction of movement of the reticle assembly. Actual information as to the magnitude of the movement in either the X or Y direction is obtained by counting the number of pulses of light received through the corresponding X or Y grating which acts to chop the beam as it is deflected when the operator moves the reticle. Since the X grating is oriented so as to be parallel with the movement of the reflected beam 15 when the reticle is moved in the X direction and the Y grating is oriented to the parallel with the movement of the transmitted beam 16 when the reticle is moved in the Y direction, the number of counts registered in each counter is proportional to the traversed distance of the reticle.

Figure 4:
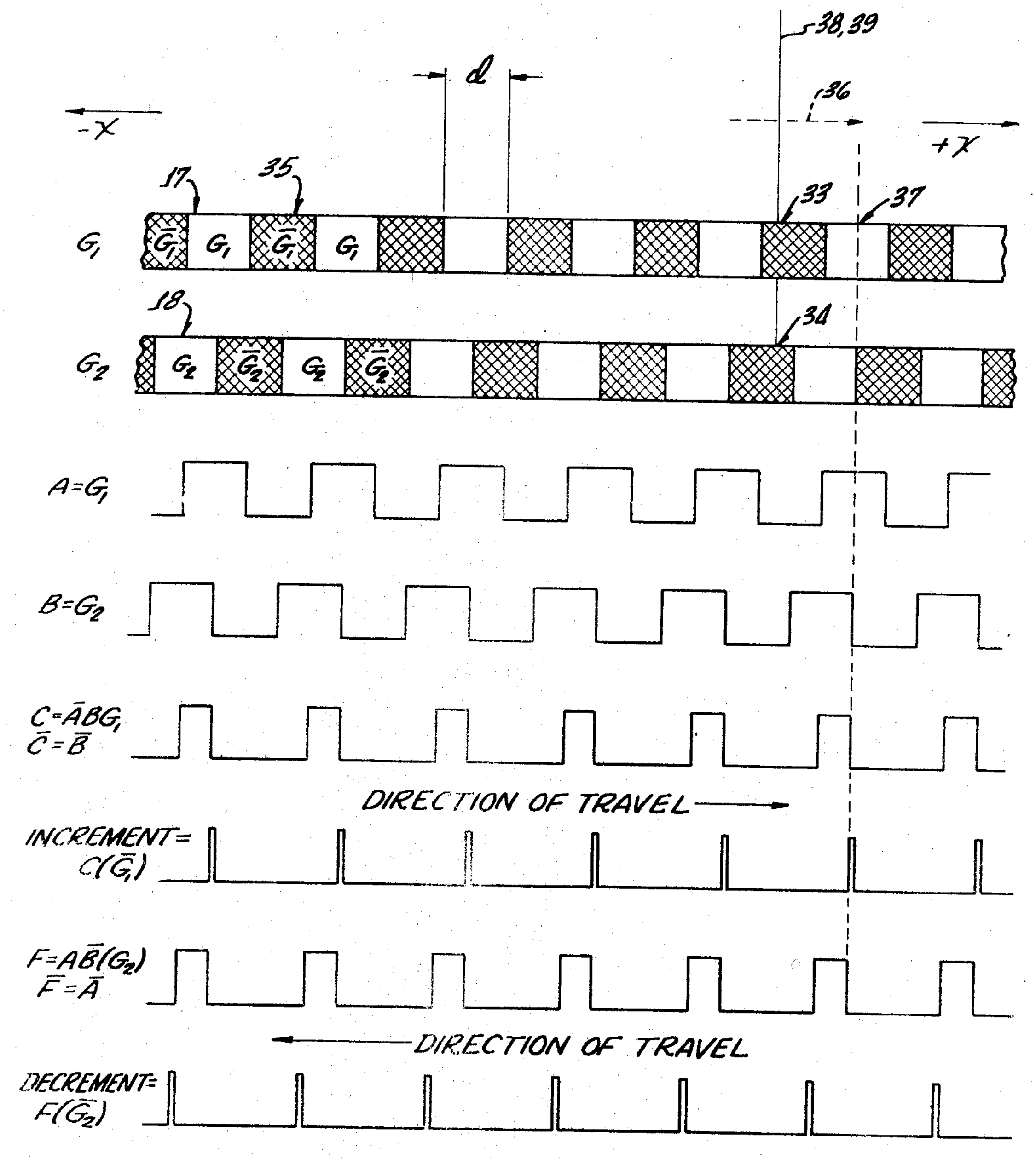
FIG. 4 is a waveform diagram illustrating the operation of the direction determining logic.
Figure 5:
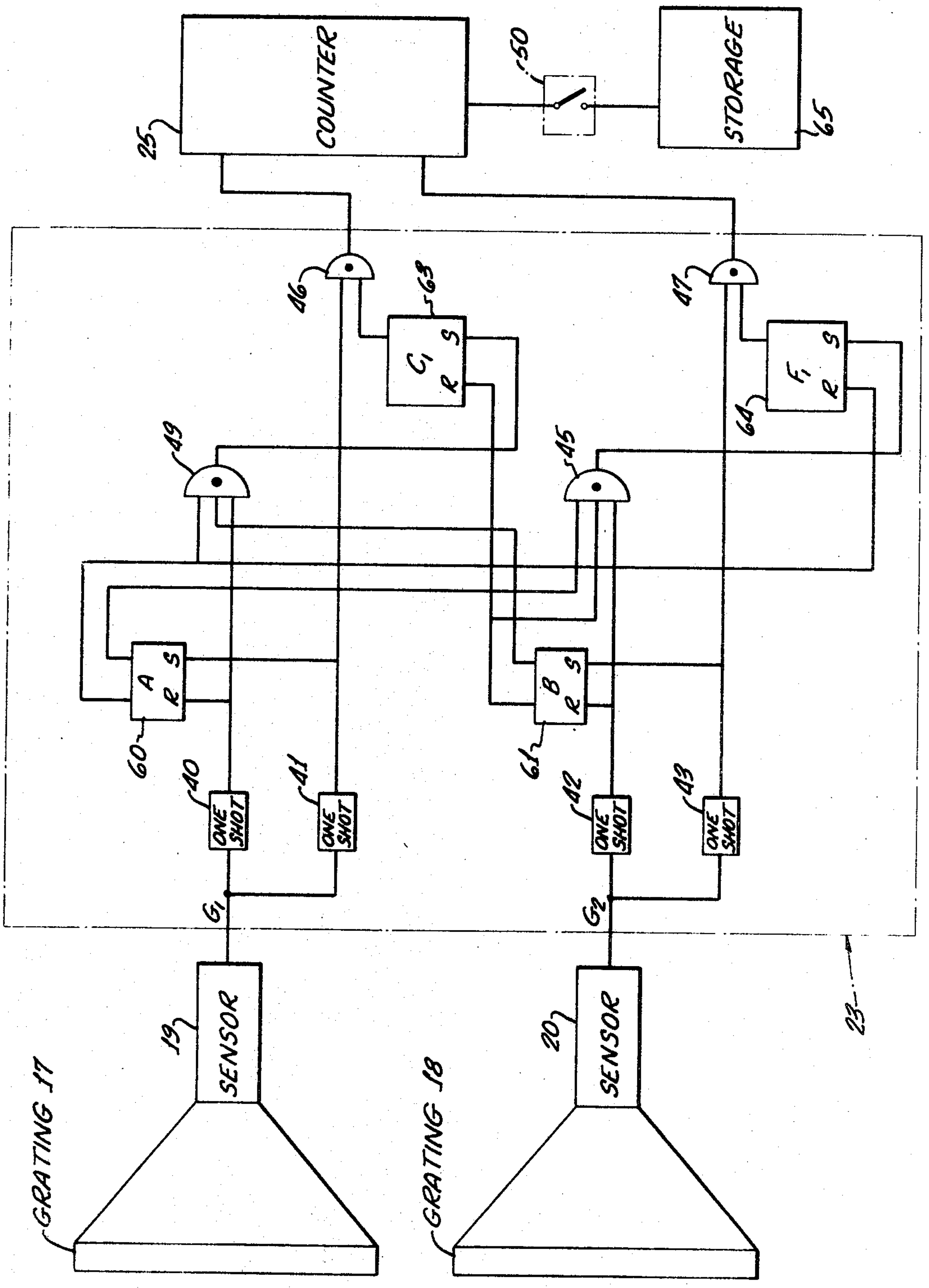
FIG. 5 is a block diagram of the electronic circuitry for determining the magnitude and direction of the reticle positional change.

FIG. 4 indicates how the grating is coded so as to provide directional information. Since the operation of the X and Y gratings is the same, only the X axis coding will be considered. The split beams 38, 39 strike the gratings 17 and 18 at the points 33 and 34. As the reticle is moved in the +X direction the beams 38 and 39 also move in the +X direction relative to the gratings 17 and 18. The up/down counter 25, which is responsively coupled to the sensors 19 and 20 and the logic 23 continues to increment as the gratings 17 and 18 act to chop the beams 38 and 39 into pulses of light. When the direction reverses, the logic circuits 22 cause the counter 25 to decrement as the beams 38 and 39 are chopped by the gratings 17 and 18. The logical equations for incrementing and decrementing the counter are given below:

$$\text{Set A when } G_1=1 \quad \text{Reset A when } G_1=0 \qquad (1)$$

$$\text{Set B when } G_2=1 \quad \text{Reset B when } G_2=0 \qquad (2)$$

$$\text{Set C when } (\overline{A})(B)(G_1)=1 \qquad (3)$$

$$\text{Reset C when } B=0 \qquad (4)$$

$$\text{Increment when } C(\overline{G}_1)=1 \qquad (5)$$

$$\text{Set F when } A\,\overline{B}\,(G_2)=1 \qquad (6)$$

$$\text{Reset F when } A=0 \qquad (7)$$

$$\text{Decrement when } F(\overline{G})_2)=1 \qquad (8)$$

where A and B are bistable multivibrators whose state is determined by whether the light beams fall upon a transparent or opaque area of the gratings 17 and 18 respectively. In FIG. 4 an opaque area of the gratings 17 and 18 is indicated by the cross hatch marking which corresponds to a binary zero. The output of the first grating 17 is indicated as $G_1$ and the second grating is indicated as $G_2$. The actual block diagram implementation corresponding to the wave forms in FIG. 4 is shown in FIG. 5.

Referring to the logical equations above and the drawings 4 and 5, the directional sensing feature may be understood as follows. The chopped signal obtained as the light beams 38 and 39 are moved relative to the gratings 17 and 18 is detected by the light sensors 19 and 20 and used to trigger the mono stable multivibrators 40–43. The one shot pulses operate to trigger the bistable multivibrators 60 and 61 according to the logical equation to produce the waveforms A and B shown in FIG. 4. The bistable multivibrator 63 has its state determined by the logic Equations 3 and 4 so as to produce the waveform C in FIG. 4 when the light source is moving in the positive X direction. It may be seen from the equations that when the light source is moving in the negative X direction the bistable multivibrator C is always in the binary "zero" or off state. This results from the fact that C is only triggered to the "one" when A=0, B=1, and when there is a pulse from the one shot multivibrator 40 indicating a transition from an opaque to transparent area on the grating $G_1$ as per Equation 3. This condition, however, can only occur if the transition region is approached from the left as shown by the dotted arrow 36 indicating the movement of the light beam in FIG. 4. If the movement of the beam is continued in the positive X direction until the point 37 is reached, the up/down counter 25 is incremented by the increment pulse formed by "anding" the output of C with the transition one shot 41 which generates A pulse when the sensor $B_2$ indicates the light beam has crossed from a transparent to opaque area of the grating $G_2$.

In an analogous manner to the above, the decrement pulse in FIG. 4 is formed when the light beam is moving in the negative X direction. The instantaneous value of the up/down counter 25 is thus the digital representation of the instantaneous X position.

The numerical value stored in the up/down counter 25 is transferred to a digital storage device 65 each time the operator depresses the "read" button 50. The information stored thus represents the digital position of each point of graphical interest which has been located by the operator.

The actual positioning of the reticle on a point of interest can be aided by any locating device which is capable of resolving between any optical transitions of interest on a given graphical display. Such a device is described in the optical scanning head application referred to on line 30, column 1.

Thus, the operator may, for example, position the reticle near a given line and then manually move the reticle assembly in the desired direction until a signal is received by the locating device thus indicating that the reticle is positioned above the line. Where a pattern or other object having three dimensions is being digitized, a stylus may be utilized to follow an edge in order to rapidly obtain boundary locations of interest.

The resolution of the system is dependent upon two factors, i.e., the beam diameter and the grating. The beam size as shown in FIG. 2 is limited by the exit aperture 6, the only requirement being that it is smaller than the grating spacing D as shown in FIG. 4. The ultimate bounds on grating resolution are determined by Raleigh's limit, which is on the order of 40,000 lines per inch. Thus, a 6′ by 6′ working area 20 may be resolved into more than 100 lines per inch using an optical grating having a length of two inches. This is comparable with present day digitizing requirements. By employing a flat field copy lens 13 in FIG. 3, the optical assembly becomes insensitive to the thickness T of the subject matter 79 being digitized.

Figure 6:
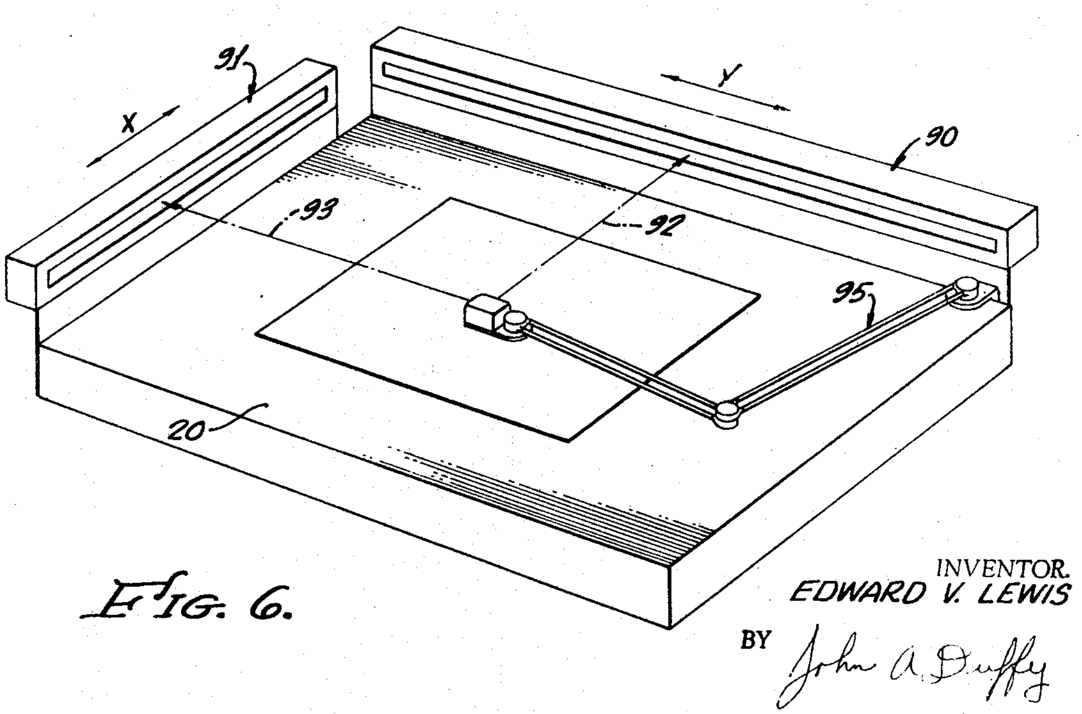
FIG. 6 illustrates an alternative embodiment which does not require an overhead optical system.

An alternative embodiment is shown in FIG. 6. Here the overhead optical system is replaced by Y and X gratings 90 and 91 mounted along the Y and X axis of the flat working surface 20. Two orthogonal beams 92 and 93 are generated instead of one. The beam 92 parallel with the X axis is chopped by the Y grating 90 when the reticle is moved in the Y direction. In a similar manner the beam 93 parallel with the Y axis is chopped by the X grating 91 when the reticle is moved in the X direction. A mechanical assembly 95 similar to that used on drafting machines may be utilized to maintain the reticle orientation so that the beams 92 and 93 strike the gratings 90 and 91 perpendicularly.

It will be apparent that the present invention is not limited in its application to digitizing drawings, but may also be employed in numerous other situations such as to digitize and store photographically displayed information; to digitize the boundaries of cloth patterns in the garment industry, and to analyze third dimension geometric figures, to name but a few. Nor is the implementation of the invention restricted to a cartesian representation. The basic concpt may be applied with equal facility to a color or other form of graphical representation.

Although a preferred embodiment of the present invention has been shown and described herein, it is understood that the invention is not limited thereto and numerous changes and substitutions may be made without departing from the spirit of the invention.

I claim:

1. An apparatus for digitizing graphically displayed information comprising: a working surface; a reticle assembly movable about said surface; means for generating an optical beam of energy attached to said reticle assembly and movable therewith; an optical lens system positioned to view said energy beam at any location on said working surface; means for splitting said viewed beam into orthogonal components; a first coded optical transmission grating positioned to have its surface perpendicular to one of said orthogonal components; a second coded optical transmission grating positioned to have its surface perpendicular to said other component; sensing means for recording the number of pulses created by the light dark transitions of said gratings as said beams move with respect to said gratings whereby the magnitude of said reticle movement may be determined; means for decoding the sequence of pulses generated by said coded gratings whereby the direction of motion of said reticle assembly may be determined.

2. An apparatus for digitizing comprising: a working surface; a reticle assembly having a polished undersurface whereby said reticle assembly may be moved in sliding contact with said working surface; means for generating first and second orthogonal optical beams attached to said reticle assembly, said beams oriented to be parallel with the plane of said polished surface; a first optical transmission grating placed to have its grating lines perpendicular to said working surface, said first grating to be oriented to be perpendicular to said first optical beam whereby said first beam will be chopped when moved relative thereto; a second optical transmission grating placed to have its grating lines perpendicular to said working surface, said second grating to be oriented perpendicular to said second beam whereby said second beam is chopped when moved relative to said second grating.

3. The combination comprising: a working surface; a reticle assembly movable with respect to said working surface; means for generating optical energy attached to said reticle assembly and movable therewith; an aperture and lens system for collimating said optical energy into a single beam; a beam splitting mirror positioned to resolve said beam into orthogonal components; a first optical transmission grating oriented to have its grating lines perpendicular to the motion of one of said beam components so as to detect the positional changes of said reticle assembly in one dimension; a second optical transmission grating oriented to have its grating lines perpendicular to the motion of the other said beam component so as to detect the positional changes of said reticle assembly in another dimension whereby the position of said reticle assembly may be determined with respect to a coordinate origin.

4. The combination comprising: a working surface; a reticle assembly movable with respect to said working surface; means for generating optical energy attached to said reticle assembly and movable therewith; two orthogonal aperture and lens systems for collimating said optical energy into orthogonal beams; a first optical transmission grating oriented to have its grating lines perpendicular to the motion of one of said beam components so as to detect the positional changes of said reticle asembly in one dimension; a second optical transmission grating oriented to have its grating lines perpendicular to the motion of the other said beam component so as to detect the positional changes of said reticle assembly in another dimension whereby the position of said reticle assembly may be determined with respect to a coordinate origin.

5. The combination comprising: a working surface; a reticle assembly movable with respect to said working surface; means for generating optical energy attached to said reticle assembly and moveable therewith; an aperture and lens system for collimating said optical energy into a single beam; a first lens system for viewing said beam; a first optical transmission grating oriented to have its grating lines perpendicular to the motion of said beam for reticle motion in one dimension; a second lens system for viewing said beam; a second optical transmission grating oriented to have its grating lines perpendicular to the motion of said beam for reticle motion in another dimension whereby the position of said reticle assembly may be determined with respect to a coordinate origin.

References Cited

UNITED STATES PATENTS

| | | | |
|---|---|---|---|
| 3,153,111 | 10/1964 | Barber et al. | 356—169 |
| 3,184,600 | 5/1965 | Potter | 250—237 |
| 3,297,879 | 1/1967 | Meyer | 250—237 |
| 3,330,964 | 7/1967 | Hobrough et al. | 250—231 X |
| 3,410,956 | 11/1968 | Grossimon et al. | 250—237 X |

JAMES W. LAWRENCE, Primary Examiner

E. R. LA ROCHE, Assistant Examiner

U.S. Cl. X.R.

235—151.32; 356—169